Jan. 5, 1971　　　　T. B. SANDS　　　　3,552,217
CONTROL APPARATUS
Filed Jan. 30, 1969
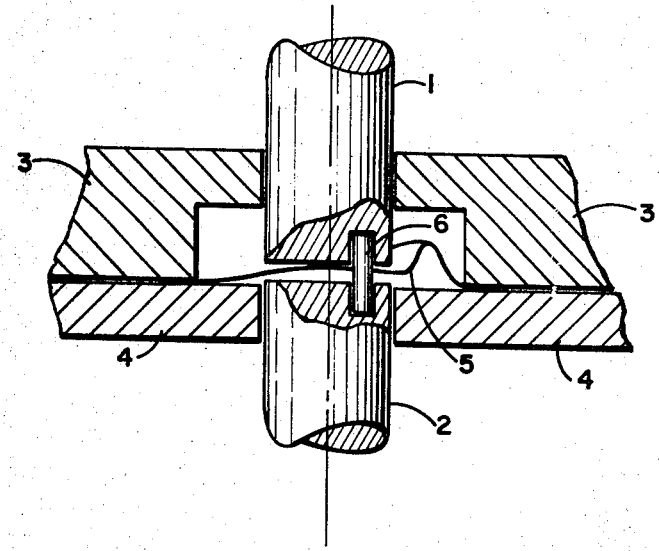
INVENTOR.
TIMOTHY B. SANDS
BY *Albin Medwed*
ATTORNEY United States Patent Office 3,552,217
Patented Jan. 5, 1971

3,552,217
CONTROL APPARATUS
Timothy B. Sands, Acton, Mass., assignor to Honeywell Inc., Minneapolis, Minn., a corporation of Delaware
Filed Jan. 30, 1969, Ser. No. 795,203
Int. Cl. F16j 15/50
U.S. Cl. 74—18                                         3 Claims

ABSTRACT OF THE DISCLOSURE

A hermetic sealed shaft coupling for transmission of rotary motion through a partition. Motion is transmitted from one moving member to another through a flexible membrane providing a hermetic seal between the two members.

The invention herein described was made in the course of or under a contract or subcontract thereunder with the Air Force.

BACKGROUND OF THE INVENTION

Field of the invention

The present invention pertains to sealed shaft couplings utilizing a flexible material.

Description of the prior art

Sealed shaft couplings for transmission of rotary motion through a partition are readily available. However, the sealing of the shaft commonly comprises packing surrounding the rotating shaft and as such is not an absolute seal. The effectiveness of this type of seal depends on the intimate relationship between the rotating shaft and a sealant material.

It is an obect of the present invention to provide an improved sealed shaft coupling for transmission of rotary motion which provides an absolute seal.

SUMMARY OF THE INVENTION

The present invention pertains to a method of transmitting rotary motion through a partition while maintaining a hermetic seal between opposite sides of the partition.

The invention utilizes a flexible membrane or diaphragm attached to the partition disposed between the ends of two rotary members having a common axis of rotation. A pin extends through and is bonded to the membrane. The pin rotatably engages a point on each rotary member eccentric from the common axis of rotation. Upon rotation of one of the shafts, the pin traverses a circular path about the common axis of rotation, transmitting the rotary motion to the other shaft while the membrane flexes to allow movement of the pin about the circle. The engagement of the pin with the ends of the rotary members is such that the membrane restrains the pin from rotary motion with respect to the membrane. A hermetic seal between the two rotating members is thus effected.

BRIEF DESCRIPTION OF THE DRAWING

The drawing is a partially sectional view of the preferred embodiment of the invention.

DESCRIPTION OF THE PREFERRED EMBODIMENT

Referring to the drawing, a shaft 2 is rotatably positioned in a hole in a partition 4. A shaft 1 is rotatably positioned in end-to-end relationship with shaft 2 by collar 3. Shafts 1 and 2 have a common axis of rotation.

A flexible membrane or diaphragm 5 is clamped or bonded between collar 3 and partition 4 and is disposed between the adacent ends of shafts 1 and 2. A cylindrical pin 6 extends through and is bonded to flexible membrane 5. The pin 6 is rotatably engaged with shafts 1 and 2 at points offset from the common axis of rotation.

In operation, rotation of either of the shafts 1 or 2 causes the pin 6 to exert a torque on the other of the shafts. The engagement of pin 6 with shafts 1 and 2 is such that membrane 5 restrains the pin 6 from rotary motion with respect to the membrane while the pin 6 is traversing a circular path about the common axis of rotation.

Rotary motion is thereby transmitted through partition 4 while maintaining a hermetic seal between the region of shaft 1 and the region of shaft 2. It will be noted that the seal is not effected between a rotary member and a stationary member. The effectiveness of the seal is only dependent upon the bonding of the diaphragm 5 to the partition 4 and the seal around the pin 6 where it extends through the diaphragm.

It will be realized that the invention lies in the use of a member affixed to a flexible diaphragm to rotatably engage two adjacent rotating members at points offset from their axis of rotation. Various embodiments utilizing the inventive concept presented should be readily apparent and remain within the scope of the present invention to be defined by the appended claims.

I claim:
1. A sealed drive mechanism for transmitting rotary motion, comprising:
    first and second shafts supported in end-to-end relationship for rotation about a common axis;
    a flexible diaphragm positioned between said shafts; and
    pin means, carried by and bonded to said diaphragm, for engaging each of said shafts at a point offset from said common axis, whereby rotation imparted to one of said shafts is transmitted through said membrane to cause a correspondingg rotation in the other shaft.
2. The sealed drive mechanism of claim 1 wherein:
    said first and second shafts define first and second cylindrical holes at said point offset from said common axis; and
    said pin means is cylindrical and is rotatably engaged with said first and second cylindrical holes.
3. Coupling apparatus comprising:
    first and second shafts supported for rotation about a common axis, said shafts having adacent ends, said shafts further having opposing cylindrical holes in said adjacent ends, said cylindrical holes having a common axis offset from and parallel to said common axis of said shafts;
    a flexible diaphragm positioned between said ends of said shafts; and
    pin means, carried by and bonded to said diaphragm, said pin means further being rotatably engaged with said opposing cylindrical holes thereby effectuating a seal through which rotary motion may be transmitted between said shafts by said pin means.

References Cited

UNITED STATES PATENTS

| 1,731,009 | 10/1929 | King | 74—18.1 |
| 2,771,781 | 11/1956 | Von Ranson | 74—18.1 |

FOREIGN PATENTS

| 98,132 | 3/1923 | Switzerland | 74—18 |
| 1,183,613 | 7/1959 | France | 74—18.1 |

FRED C. MATTERN, Jr., Primary Examiner
F. D. SHOEMAKER, Assistant Examiner